United States Patent [19]
Sterff

[11] 3,887,850
[45] June 3, 1975

[54] DELAY CIRCUIT FOR A RELAY

[75] Inventor: Wilhelm Sterff, Schliersee, Germany

[73] Assignees: Matsushita Electric Works, Ltd., Kadoma City, Osaka, Japan; SDS-Electro GmbH, Munich, Germany

[22] Filed: Nov. 14, 1973

[21] Appl. No.: 415,651

[30] Foreign Application Priority Data

Nov. 23, 1972 Germany ........................... 2257373

[52] U.S. Cl. ................ 317/141 S; 307/294; 328/78
[51] Int. Cl. ........................ H01h 47/18; H01h 47/32
[58] Field of Search ....... 317/141 S, 142 R; 328/77, 328/78, 129, 131; 307/293, 294

[56] References Cited

UNITED STATES PATENTS

| | | | |
|---|---|---|---|
| 2,867,754 | 1/1959 | O'Bleness | 317/141 S |
| 3,282,631 | 11/1966 | Mosinski | 317/141 S |
| 3,671,817 | 6/1972 | Seipp | 317/141 S |

*Primary Examiner*—L. T. Hix
*Attorney, Agent, or Firm*—Edmund M. Jaskiewicz

[57] ABSTRACT

The delay circuit comprises a differential amplifier having an output connected to the winding of a relay, a non-inverting input connected to the center tap of an ohmic potential divider connected across the voltage supply and inverting input connected to the junction between a first ohmic resistor and a capacitor connected in series therewith to the voltage supply. The output of the amplifier is connected through a diode which blocks when the relay is not energized to the non-inverting input of the amplifier. A second ohmic resistor in series with a reference voltage source is connected in parallel to the first resistor and the capacitor. Those terminals of the second resistor and the capacitor which are not connected to the voltage supply are interconnected by a further diode which conducts in the direction of the voltage supply. The reference voltage is at least equal to twice the threshold voltage of a diode and the first resistor has a high ohmic value with respect to the second ohmic resistor and is shunted by a diode which blocks in the direction of the voltage supply.

4 Claims, 2 Drawing Figures

DELAY CIRCUIT FOR A RELAY

The present invention relates to a circuit for delaying the response of a relay which has an operating winding connected on the one hand directly to one pole of a supply voltage and on the other hand through an interposed delay network to the other pole of the supply voltage.

In circuits for delaying the response of relays RC-members are conventionally used which permit the delay to be predetermined by adjusting their time constant. Such an RC-member may comprise a capacitor and an ohmic resistor connected in series. When a predetermined state of charge has been reached or when the capacitor is fully charged, the relay operates and the capacitor is then being discharged. By suitably selecting the values of the several elements of the RC-member the desired time constant can be determined with an adequate degree of precision. However, the intended delay in the response of the relay occurs only in the first charging cycle because only then does the cycle start with a fully discharged capacitor. In subsequent cycles which may occur at various arbitrary intervals of time from the first cycle the residual charge still contained in the capacitor of the RC-member is not defined and, consequently, the instant at which the voltage which builds up in the capacitor actually reaches the response voltage of the relay cannot be exactly predicted. The actual delay is therefore more or less shorter than the desired delay. Since defined conditions apply only when the capacitor is charged for the first time the described result is known as the "first cycle effect."

One possible way of achieving actual delay times which are equal to the desired delay is to short-circuit the capacitor of the RC-member by relay contacts at the instant that the relay operates. Such an arrangement will ensure that after each delayed response of the relay the capacitor is completely discharged. The delay time will then be independent of the time that elapses between consecutive operating cycles. However, it is a disadvantage of this arrangement that the number of available relay contacts is reduced and that a relay cannot be employed which has only one set of contacts.

It is therefore the principal object of the present invention to provide such a delay circuit which will enable the predetermined delay times to be maintained constant within a wider range of delay times without the use of special relay contacts.

It is another object of the present invention to provide such a delay circuit which is simple in design and reliable in operation.

Figure 1:
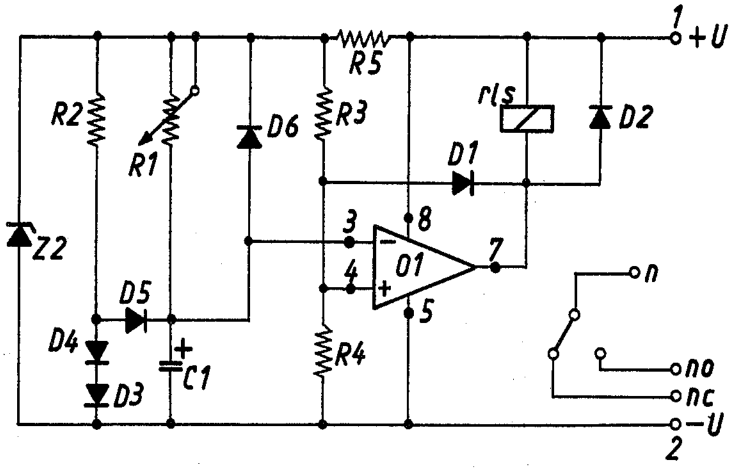
Figure 2:
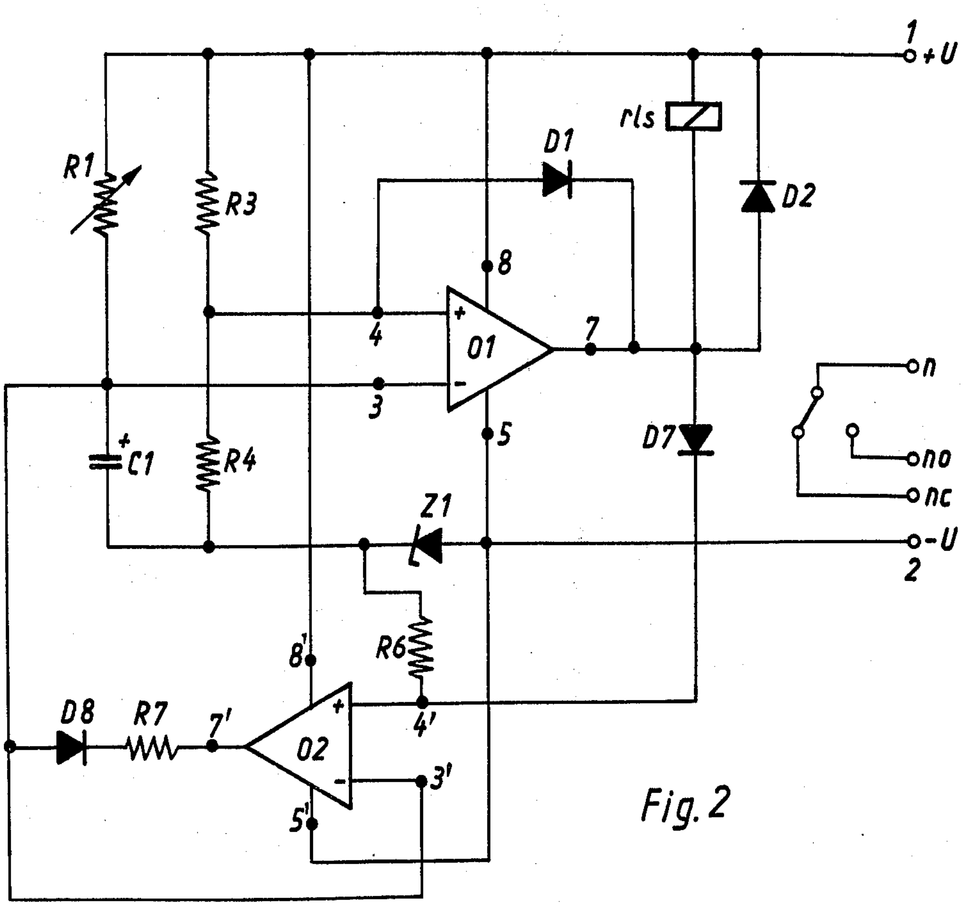

Other objects and advantages of the present invention will be apparent upon reference to the accompanying description when taken in conjunction with the following drawings, which are exemplary, wherein:

FIG. 1 is an electrical circuit diagram showing schematically the delay circuit according to the present invention incorporating a single differential amplifier; and FIG. 2 is a view similar to that of FIG. 1 but showing such a delay circuit employing two differential amplifiers.

Proceeding next to the drawings wherein like reference symbols indicate the same parts throughout the various views a specific embodiment and modifications of the present invention will be described in detail.

According to one aspect of the present invention, the delay network comprises a differential amplifier whose output is connected to the winding of the relay, the non-inverting input connected to the center tap of an ohmic potential divider placed across the supply voltage, and the inverting input connected to the junction between a first ohmic resistor and a capacitor connected in series with the resistor to the supply voltage. The output of the differential amplifier is connected through a diode, which blocks when the relay is not energized, to the non-inverting input of the amplifier. A second ohmic resistor in series with a reference voltage source is connected in parallel to the first ohmic resistor and the capacitor, and those terminals of the second ohmic resistor and of the capacitor which are not connected to the supply voltage are interconnected by a further diode which conducts in the direction of the supply voltage. The reference voltage is at least equal to twice the threshold voltage of a diode. The first ohmic resistor has a high ohmic value in relation to the second ohmic resistor and is shunted by a diode which blocks in the direction of the supply voltage.

According to the invention, the delay circuit may also comprise a first differential amplifier whose output is connected to the operating winding of the relay, the non-inverting input to the center tap of an ohmic potential divider connected to the supply voltage, and the inverting input to the junction between a first ohmic resistor and a capacitor connected in series with the capacitor to the supply voltage. The output of the first differential amplifier is connected through a diode which blocks when the relay is not energized, to the non-inverting input of the first differential amplifier. A second differential amplifier is also provided, of which the non-inverting input is connected on the one hand through a diode which conducts when the relay is not energized, to the output of the first differential amplifier and on the other hand through a further ohmic resistor to that terminal of the capacitor which is connected to the supply voltage, whereas the inverting input is connected directly and its output through an interposed diode which blocks when the relay is not energized indirectly to the junction between the first ohmic resistor and the capacitor. A Zener diode is connected to the supply voltage and the source of the supply voltage.

The delay circuit in FIG. 1 comprises a relay *rls*, one end of the relay being connected to the positive pole 1 of a supply voltage U, whereas the other end is connected to the output of a differential amplifier 01. The non-inverting input 4 of the differential amplifier 01 of which the operating terminals 5 and 8 are connected to the supply voltage U is connected to the center tap of an ohmic potential divider R3 and R4 which is similarly connected to the supply voltage U. The inverting input 3 is connected to the junction between a first ohmic resistor R1 comprising an adjustable potentiometer and a capacitor C1. Moreover, a second ohmic resistor R2 in series with two series-connected diodes D3 and D4 which conduct in the direction of the supply voltage U form a shunt across the first ohmic resistor R1 and the capacitor C1. The ohmic value of the second ohmic resistor R2 is low compared with that of resistor R1. Moreover, a further diode D5 which conducts in the direction of the supply voltage U interconnects those two terminals of the second ohmic resistor R2 and of the capacitor C1 which are not connected to the supply voltage U. A diode D6 which blocks in the direction of the supply voltage U by-passes the first ohmic resistor R1.

When the supply voltage U is switched on, a positive potential is applied by the potential divider R3, R4 to the non-inverting amplifier input 4 and causes a positive potential to appear in the output 7 of the amplifier 01. Consequentialy, the relay *rls* will not be energized and its moveable center blade *n* will remain, for instance, at the fixed contact *nc*. At the same time, the capacitor C1 will at once be charged through the second ohmic resistor R2 and the additional diode D5 until the potential of the capacitor has built up to the threshold potential of a diode. The time required for this first part of the charging of the capacitor C1 to be completed is determined by the magnitude of the second ohmic resistor R2, but since the second ohmic resistor has a low value compared with that of the first ohmic resistor R1 it is negligible with regard to the intended delay of the relay *rls*.

The second part of the charging process now follows in which the capacitor C1 continues to be charged through the high-ohmic resistor R1. The product of the resistance value of the first ohmic resistor R1 and of the capacitance value of the capacitor C1 determines the time of operating delay. As the charge in capacitor C1 builds up, the positive potential at the point of connection of capacitor C1 to the first resistor R1 and hence the potential at the inverting amplifier input 3 rises. When the intended period of delay expires, the potential at the inverting amplifier input 3 reaches the potential of the noninverting amplifier input 4. When this is the case, the polarity of the voltages appearing in the output 7 of the differential amplifier 01 changes to negative and the relay is thus energized. The movable contact blade *n* therefore changes over to the other fixed contact *no*. With the change in the sign of the differential amplifier output, the diode D1 which had hitherto blocked the the diode D1 which had hitherto amplifier feedback will now conduct and transmit the negative output potential of the amplifier 01 back to its non-inverting input 4. This ensures that the existing state will be maintained.

For changing the relay *rls* back to its original position the supply voltage U must be cut off. This simultaneously causes the capacitor C1 to discharge through the diode D6 which had so far blocked this path. The diode D6 discharges the capacitor C1 to its threshold voltage. If the interruption of the supply voltage U continues, the capacitor C1 will continue to discharge, through the first ohmic resistor R1. This means that in every case the capacitor C1 will first be discharged to the threshold voltage of a diode and that upon the restoration of the supply voltage U it will at once be recharged through the second ohmic resistor R2 and the additional diode D5 to at least the threshold voltage of a diode. Since in each operation cycle the charge of the capacitor C1 is therefore immediately brought to a defined state within a period which is negligibly small compared with the period of delay which is selectable by the adjustment of the first ohmic resistor R1, this preselected delay will always be exactly maintained irrespectively of the length of the interval that intervenes between consecutive charging cycles.

Moreover, in the circuit illustrated in FIG. 1 a Zener diode Z2 preceded by an ohmic resistor R5 is provided for sufficiently compensating fluctuations in the supply voltage to preclude any effect of such fluctuations upon the selected period of delay. A diode D2 which is shunted across the operating winding of the relay *rls* protects the amplifier 01 from induction potentials which arise when the relay *rls* operates.

With only one differential amplifier as in FIG. 1, a voltage reference source may comprise two diodes D3 and D4 which conduct in the direction of the supply voltage, or of a diode which conducts in the direction of the supply voltage and an ohmic resistor in series with the said diode.

In either case sources of reference voltage which can be very easily provided are thus obtained. When only one diode is used in series with an ohmic resistor the capacitor, when the supply voltage is switched on, is immediately charged to a potential equal to the voltage drop across this resistor. The resistor is so chosen that the voltage drop across the resistor is at least equal to the threshold voltage of a diode. The arrangement advantageously ensures that the temperature dependence of the threshold voltages of diodes cannot have a significant effect on the potential level to which the capacitor is charged.

The first ohmic resistor R1 may have a resistance about 100 to 1,000 times greater than the resistance of the second ohmic resistor R2. As a result, the time needed for the first charging stage in which the capacitor is charged through the second ohmic resistor is only one-hundredth to one-thousandth of the time needed for the second stage which represents the delaying stage. The delay in the response of the relay which can be preselected without difficulty by varying the resistance of the first ohmic resistor, is thus in practice dependent exclusively upon the time constant determined by the resistance of the first ohmic resistor and the capacitance of the capacitor.

Thus, it is apparent that the capacitor which determines the delay in cooperation with the first ohmic resistor will be charged, as soon as the supply voltage is switched on, through the second ohmic resistor which has a low ohmic value compared with the first ohmic resistor, and through the diode D5 to a potential which is at least equal to the threshold potential of a diode. The relay of which the operating winding is connected on the one hand for instance to the positive pole of the supply voltage and on the other hand to the output of the differential amplifier remains in the non-operative state because the potential applied to the non-inverting input of the differential amplifier by the ohmic potential divider is positive and hence the potential in the amplifier output is likewise positive. The capacitor then continues to be charged through the first ohmic resistor which causes the positive potential at the inverting input of the differential amplifier to rise.

At the end of the period of delay as determined by the time constant of the RC-member formed by the capacitor and the first ohmic resistor, the positive potential at the inverting input of the differential amplifier becomes equal to the optential at the non-inverting input. The differential amplifier therefore changes to a negative potential in its output. Consequently the relay will now be energized. The negative potential in the amplifier output is fed back to the non-inverting amplifier input and this ensures that the relay remains in the operative state. However, when the supply voltage is interrupted, the relay releases and the capacitor is instantaneously discharged through the diode D6 which forms a shunt across the first ohmic resistor and blocks the supply voltage, until the capacitor voltage is at most equal to the threshold value of the diode.

If the supply voltage remains interrupted for a longer period, the capacitor continues to be discharged through the reverse resistance of the diode or through the first ohmic resistor. This means that in every case, even when the supply voltage is only briefly interrupted, the capacitor will have been discharged to at least the threshold voltage of a diode and that upon the restoration of the supply voltage it will be instantaneously recharged through the low ohmic charging circuit consisting of the second ohmic resistor and the additional diode so that its voltage is at least equal to the threshold value of a diode. This is advantageous since in each charging cycle the capacitor is first charged, within a period of time that is negligibly short in relation to the delay time, to at least the threshold voltage of a diode and then through a first ohmic resistor which determines the delay time until the relay at the end of the preselected delay responds.

The charging of the capacitor therefore proceeds in two stages, a first stage consisting in charging the capacitor substantially instantaneously to the threshold voltage of a diode and the second stage providing the desired time of delay. The time of delay selected in the proposed circuit arrangement for a relay to respond, a time which is selectable within a wide range by the choice of the values of the first ohmic resistor and of the capacitor, can therefore be precisely maintained, irrespective of the time lapse between consecutive charging cycles.

The same effect can also be achieved if the operating winding of the relay is interposed between the negative pole of the supply voltage and the output of the differential amplifier, the non-inverting input of the amplifier being in such a case connected to the junction between the first ohmic resistor and the capacitor, and the inverting amplifier input to the center tap of the ohmic potential divider.

A delay circuit based on the use of two differential amplifiers is shown in FIG. 2 in which it is also proposed that the threshold voltage of the Zener diode interposed between the terminal of the capacitor which is connected to the supply voltage and the source of the supply voltage should exceed the sum of the threshold voltage of the diode included in the output circuit of the second differential amplifier plus that which remains between the output of the second differential amplifier and one pole of the supply voltage when the relay is energized.

The purpose of this arrangement is to discharge completely the previously charged capacitor despite the presence of the diode in the output circuit of the second differential amplifier. Moreover, another result is to prevent the first differential from changing from its existing state in which the relay is in operating position into the reverse state after the capacitor has discharged. The relay therefore remains in operating position until the supply voltage is actually discontinued.

There is also provided an ohmic resistor between the output of the second differential amplifier and the diode which is connected to the junction between the first ohmic resistor and the capacitor. This ohmic resistor must be of relatively low ohmic resistance and may be located either inside or outside the amplifier. This resistor is intended to limit the discharging current of the capacitor for the protection of the second differential amplifier.

The delay circuit illustrated in FIG. 2 contains a relay *rls* of which the operating winding is connected on the one hand to the positive terminal of the supply voltage U and on the other hand to the output 7 of a first differential amplifier 01. The amplifier 01 has the two supply terminals 5 and 8 which are connected to the supply U. The non-inverting input 4 of the amplifier is connected to the center tap of an ohmic potential divider R3, R4 and its inverting input 3 is connected to the junction between the first ohmic resistor R1 and the capacitor C1 which together determine the operating delay of the relay. Moreover, there is also provided a second differential amplifier 02 likewise operatd by the supply voltage U applied to its terminals 5' and 8'. The non-inverting input 4' of this second amplifier is connected, on the one hand, to the output 7' of the first amplifier 01 through a diode D7 which conducts when the relay *rls* is not energized and, on the other hand, through another ohmic resistor R6 to the terminal of capacitor C1 which is connected to the supply voltage U. The inverting input 3' of the second amplifier 02 is connected directly and the output 7' of the amplifier indirectly through a diode D8 which blocks when the relay *rls* is not energized to the junction between the first ohmic resistor R1 and the capacitor C1. Finally a Zener diode Z1 is interposed in reverse current direction between the terminal of capacitor C1 which is connected to the supply voltage U and the negative pole 2 of the supply source. The threshold voltage of the Zener diode Z1 is so chosen that it is greater than the sum of the threshold voltage of diode D8 plus the residual threshold voltage which remains between the output 7' and the terminal 5' for applying the supply voltage U to the second amplifier 02 when the relay *rls* is energized. Furthermore, for the protection of amplifier 02 from excessively high discharging currents of the capacitor C1 the output circuit of this amplifier contains a low ohmic resistor R7. If the amplifier is an operational amplifier made by integrated production techniques then this resistor may be an integral component of the second amplifier 02. The first and the second differential amplifiers may be accommodated in a common housing, as is conventional in integrated circuit technology.

When in the circuit arrangement according to FIG. 2 the supply voltage U is switched on, positive potential will at once be applied to the non-inverting input 4 of the first amplifier 01. Consequently, the output signal 01 of this amplifier will be positive and the relay *rls* will not be energized. The relay contacts may be in the position shown in the diagram. At the same time, positive potential is transmitted by diode D7 from the output 7 of the first amplifier 01 to the non-inverting input 4' of the second amplifier 02 and the voltage appearing in the output 7' of this second amplifier will likewise be positive. The diode D8 in the output 7' of amplifier 02 therefore blocks and the capacitor C1 can be charged through the first ohmic resistor R1 without interference. As soon as the potential at the junction of the first ohmic resistor R1 with the capacitor C1 which is connected to the non-inverting input 3 of the first differential amplifier 01 reaches the potential at the non-inverting amplifier input 4 according to the preselected delay time, the first amplifier 01 changes over to a negative potential in its output 7. The relay *rls* will not be energized and its moveable blade *n* will be deflected into contact with the fixed contact *no*. The diode D1 which now conducts feeds back the negative output voltage to the non-inverting input 4 of the first amplifier 01, causing the existing state of the *rls* to be hold. The Zener diode Z1 now also admits negative potential from the terminal of capacitor C1 which is connected to the supply voltage U, through the ohmic resistor R6 to the non-inverting input 4′ of the second differential amplifier 02, thus causing negative potential to appear in the output 7′ of the second amplifier and the diode D8 to conduct. The capacitor C1 then abruptly discharges through the output 7′ of the second amplifier 02 until the potentials of the two plates are exactly equal. The relay *rls* remains in the energized state until the supply voltage U is switched off.

The described circuit arrangement leads to a complete discharge of capacitor C1 at the end of the preselected period of delay, whether the supply voltage U is switched off or not.

Consequently this delaying circuit is ready for renewed operation immediately upon the expiration of the delay period. Because of the complete discharge of capacitor C1 the initial state upon which each operating cycle is based, irrespective of the periods of time that elapse between cycles, is always exactly the same. The above described "first cycle effect" is therefore completely eliminated. An effect on the delay time due to changes in the threshold voltages of diodes or transistors is also completely out of the question.

The advantage of the two amplifier circuit is that after each charging cycle, irrespective as to whether the voltage supplying the circuit is switched off or not, the capacitor will be fully discharged through the output of the second differential amplifier. This ensures that in each charging cycle, irrespective of the length of the interval that has elapsed since the preceding cycle, the cycle will be based on the capacitor being fully discharged. Hence an exact maintenance of the delay time prescribed by the time constant of the RC-member will be assured for the response of the relay. The complete discharge of the capacitor via the output of the second differential amplifier also provides complete independence of the selected delay from fluctuations in ambient temperature. More particularly, when the supply voltage is switched on, a positive potential is applied by the ohmic potential divider to the non-inverting input of the first differential amplifier so that the output of this amplifier is also positive and prevents the relay, in which the other end of the operating winding is connected to the positive pole of the supply, from being operated.

The diode which is interposed between the output of the first differential amplifier and the non-inverting input of the second differential amplifier conducts and positive potential is also applied to the non-inverting input of the second differential amplifier. Hence, the output of the second differential amplifier is likewise positive and the diode between this output and the juction betwen the first ohmic resistor and the capacitor blocks. At the same time, the capacitor is charged through the first ohmic resistor until the potential of the inverting input of the first differential amplifier is equal to that of the non-inverting input of this amplifier. The potential in the output of the first differential amplifier will therefore now change from a positive to a negative value and the relay will respond. The diode interposed between the output of the first differential amplifier and its non-inverting input will feed the negative potential back to the non-inverting input, thereby ensuring that the output will continue to be negative and the relay will continue to hold. At the same time, the diode which is interposed between the output of the first differential amplifier and the non-inverting input of the second differential amplifier will cease to conduct. Through the additional ohmic resistor and the Zener diode which is non-conducting in the direction of the supply current and which are both connected to that terminal of the capacitor which is connected to the supply voltage negative potential is applied to the non-inverting input of the second differential amplifier, the inverting input of this amplifier which is directly connected to the junction of the first ohmic resistor and the capacitor becoming increasingly positive as the charge of the capacitor rises. When the potential at the inverting input of the second differential amplifier reaches or slightly exceeds the potential of the non-inverting input, the output potential of this amplifier abruptly becomes negative and the capacitor will be completely discharged irrespectively as to whether the supply voltage is switched off or not. This means that each charging cycle begins with a completely discharged capacitor and that the intended delay of operation of the relay can therefore be exactly maintained, irrespective of the length of the intervals between consecutive charging cycles and independently of any fluctuations in the temperature of the environment.

When two differential amplifiers are used for controlling the delay of response of a relay the described advantages are also secured if the operating winding of the relay is placed between the negative pole of the supply and the output of the first differential amplifier, the non-inverting input of this amplifier being then connected to the junction of the first ohmic resistor and the capacitor and the inverting amplifier input connected to the center tap of the ohmic potential divider.

It will be understood that this invention is susceptible to modification in order to adapt it to different usages and conditions, and accordingly, it is desired to comprehend such modifications within this invention as may fall within the scope of the appended claims.

What is claimed is:

1. A circuit to delay for a predetermined time interval the response of a relay having an operating winding with one side conneted to one side of a voltage supply and comprising a differential amplifier having an output connected to the other side of the winding and non-inverting input and an inverting input, a potential divider connected across said voltage supply and having a center tap connected to said non-inverting amplifier input, a first resistor and a capacitor in series therewith both connected across said voltage supply, said amplifier inverting input connected between said first resistor and said capacitor, a diode which is blocking when the relay is not energized connected between said amplifier output and said amplifier non-inverting input, a reference voltage source comprising one of fourth and fifth diodes conducting in the direction of said voltage supply or a diode conducting in the direction of said voltage supply and a resistor in series with said diode, a second resistor in series with said reference voltage source and in parallel with said first resistor and said capacitor, said second resistor having a higher ohmic value with respect to said first resistor, a second diode conducting in the direction of the voltage supply connected to those terminals of said first resistor and said capacitor which are not connected to said voltage supply, and a third diode shunting said first resistor and blocking in the direction of said supply voltage, the reference voltage being at least twice the threshold voltage of a diode, said first resistor comprising an adjustable potentiometer having an electrical resistance of about 100-1000 times that of said second resistor.

2. A circuit to delay for a predetermined time interval the response of a relay having an operating winding with one side connected to one side of a voltage supply and comprising a first differential amplifier having an output connected to the other side of the relay winding and a non-inverting input and an inverting input, a potential divider connected across said voltage supply and having a center tap connected to said non-inverting input, a first resistor and a capacitor in series therewith both connected across said voltage supply, said inverting input connected between said first resistor and said capacitor, a diode blocking when said winding is not energized connected between said amplifier output and said first amplifier non-inverting input, a second differential amplifier having an output and a non-inverting input and an inverting input, a second diode conducting when said relay winding is not energized connected to the output of said first amplifier and to the non-inverting input of said second amplifier, a second resistor connected to said second amplifier non-inverting input and to the side of the capacitor connected to the voltage supply, the second amplifier inverting input connected between said first resistor and said capacitor, a third diode which blocks when the relay is not energized connected to said second amplifier output and between said first resistor and said capacitor, and a Zener diode connected in reverse between said voltage supply and the side of said capacitor connected to said voltage supply.

3. A circuit as claimed in claim 2 wherein the threshold voltage of said Zener diode is greater than the sum of the threshold voltage of said third diode plus the threshold that remains between the second amplifier output and one side of the voltage supply when the relay is energized.

4. A circuit as claimed in claim 2 and comprising a third resistor between said second amplifier output and said third diode.

* * * * *